US007165218B1

(12) United States Patent
Hancock (10) Patent No.: US 7,165,218 B1
(45) Date of Patent: Jan. 16, 2007

(54) SYSTEM AND METHOD FOR MANAGING WEB PAGE MEDIA

(75) Inventor: Christopher David Hancock, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 608 days.

(21) Appl. No.: 09/883,751

(22) Filed: Jun. 18, 2001

(51) Int. Cl.
*G06F 17/18* (2006.01)
*G06F 17/30* (2006.01)
*G06F 17/21* (2006.01)

(52) U.S. Cl. ................ 715/530; 715/500; 715/511; 715/744; 715/760; 709/204; 709/205

(58) Field of Classification Search ........... 715/500, 715/500.1, 511, 530, 744, 760; 709/204, 709/205; 345/744, 760
See application file for complete search history.

(56) References Cited

U.S. PATENT DOCUMENTS

| 5,895,476 | A | * | 4/1999 | Orr et al. | 715/517 |
| 6,088,710 | A | * | 7/2000 | Dreyer et al. | 715/517 |
| 6,161,114 | A | * | 12/2000 | King et al. | 715/517 |
| 6,594,664 | B1 | * | 7/2003 | Estrada et al. | 707/10 |
| 6,636,889 | B1 | * | 10/2003 | Estrada et al. | 709/203 |
| 6,728,762 | B1 | * | 4/2004 | Estrada et al. | 709/218 |
| 6,732,148 | B1 | * | 5/2004 | Estrada et al. | 709/205 |
| 6,748,425 | B1 | * | 6/2004 | Duffy et al. | 709/217 |
| 6,772,393 | B1 | * | 8/2004 | Estrada et al. | 715/512 |
| 2003/0142126 | A1 | * | 7/2003 | Estrada et al. | 345/738 |

* cited by examiner

*Primary Examiner*—Stephen Hong
*Assistant Examiner*—Joshua D Campbell
(74) *Attorney, Agent, or Firm*—Perkins Coie LLP (57) ABSTRACT

A computer-implemented system for managing media that is used in the development of Web pages. A media managing software module supports the collection and storage of media for use by artists and writers in creating Web pages. The media managing software module further supports the delegation of tasks between artists and writers when creating Web pages. Writers can use the media managing software module to either insert media references into the Web page or to create specs requesting media. Artists can use the specs to create or locate needed media and associate the media with the request. The media managing software module can track of the status of requests for media and verify the availability of referenced media.

15 Claims, 10 Drawing Sheets

SYSTEM AND METHOD FOR MANAGING WEB PAGE MEDIA

TECHNICAL FIELD

The present invention is generally directed to creating customized files of information for viewing on the World Wide Web. More specifically, the present invention provides a software module that can support the management of media used in Web design.

BACKGROUND OF THE INVENTION

The Internet has quickly become a popular means for transmitting information because of the world-wide access it provides to information resources. The information on the Internet is available in a variety of formats and it can have educational, entertainment, or business purposes. The World Wide Web (the "Web") is one of the largest and most popular distributed computing networks that make-up the Internet. The Web comprises interconnected computers from around the world. A computer connected to the Internet can download digital information from Web server computers. The Web comprises resources and clients that communicate digital information and instructions typically using a format known as a markup language. Examples of common markup languages include Hypertext Markup Language (HTML), Extensible Markup Language (XML), and Dynamic Hypertext Markup Language (DHTML). The instructions in the markup language can include information for formatting text, linking to digital data, and receiving digital data.

Typically, the Web server computers that comprise the World Wide Web have files of information called Web pages that can be displayed on a remote computer. A person operating the remote client computer connected to the Internet can use a software module called a browser to view the files of information available on the Web. The files of information, or Web pages, can include menu choices and highlighted words that provide connections to further information.

Somewhat analogous to a yellow pages telephone directory, Web pages are commonly used today to provide information. However, beyond just traditional business information available in a telephone directory, Web pages can provide access to a wide variety of personal, educational, commercial, and entertainment information. The interactive nature of Web pages have made them a very desirable way to communicate information. As a result, the design of Web pages has become a complex process often done on a large-scale involving many people.

Generally, the people that design Web pages are categorized as either writers or artists. The writer drafts the text that is inserted into a Web page. The artist is responsible for creating all of the media that is inserted into the Web page. Examples of media that can be inserted into an HTML document include, but are not limited to, art, graphics, sounds, and video such as Macromedia Flash movies or Apple Quick Time movies. Typically, the collaboration is initiated by the writer who is drafting an HTML document. When the writer wants to insert media at a particular point in the HTML document, she writes a specification ("spec") which describes and identifies what media is needed at that point in the document. The writer can continue drafting the text without having to actually locate and insert the media. The location and insertion of media into the HTML document is performed at a later time by the artist.

However, the problem with the collaborative approach to drafting HTML documents is that a typical Web page often has numerous pieces of media. Furthermore, a typical Web site project can involve the production of many Web pages which further increases the number of media pieces needed. The identification and retrieval of the correct media for each spec in an HTML document often becomes confused because of the numerous specs within a project.

In view of the foregoing, there is a need in the art for a system which will support the easy creation of Web pages of varying design. Specifically, a need exists for a collaborative approach to creating Web pages where one person can draft the text for a Web page and insert requests for media at desired points in the Web page. A further need exists for another person to be able to locate the requests for media in the Web page and satisfy those requests. A need also exists to be able to create a collection of media that will be available for use in completing Web pages. Finally, a need exists to be able to manage the collection of media, the requests for media in the Web page, and which requests have been fulfilled.

SUMMARY OF THE INVENTION

The present invention is generally directed to a software module for managing the media needed in creating Web pages for Web sites. The present invention improves upon the collaborative approach to creating HTML documents by providing a managing tool for the numerous specs and the media with which they are associated. A media managing software module has several features that support the creation of Web pages with media. One feature is a browser that allows a writer to view existing media file specs and, when a desired file is located, insert a reference to the media file in the text the writer is drafting. If the desired file is not accessible, the writer can create a spec describing the needed media for an artist to fulfill. Another feature that assists the writer is that she can associate a screen shot of the media with the spec which further aides the artist later in identifying the media. Once the text for a project is drafted by the writers, the media managing software module can generate a report, for the artist, of all specs within the project which need media. After the artist fulfills the specs in the HTML documents, the media managing software module can automatically replace each spec with the desired reference. Finally, the media manager can also perform a verification process to ensure that all referenced files in the Web pages are available and to remove any unwanted files from the HTML project's directory structure.

In one aspect, the invention comprises a method for managing the media used in creating Web pages. An administrator accesses the media managing software module and locates types of media that can be used in a particular Web design project. The administrator can define these media types within the media managing software module and store the media types in a storage device, such as a database. The administrator's functions organize the media files that can be collected and stored for use in designing Web pages.

The present invention further provides a method for creating Web pages using a media managing software module. A writer can use the media managing software module to search for media and insert media references in the Web page that she is designing. If the writer cannot locate the needed media, she can create a spec that serves as a request to an artist to supply the needed media. The writer can include a screen shot or graphical image of the needed media with the spec to assist the artist in identifying the needed media. The media managing software module can store the spec data for later access by the artist. The writer can then resume writing the text for the Web page. The media managing software module also enables the writer to update any specs that the artist has fulfilled by associating a media reference.

In another aspect, the invention provides a method for an artist to generate a report of unfulfilled specs for a particular Web design project. The artist can select a spec and either create or locate the needed media. The artist then can fulfill the spec by associating the media with the spec.

The present invention further comprises a system for managing the use of media in Web pages. A media managing software module can be located on a server computer and can be accessed by clients coupled to the server computer via a distributed computer network. The clients can represent an administrator, writer, or artist. An administrator can access the media managing software module and define the media types to be stored on a database coupled to the server computer. A writer can, while drafting the text for a Web page, use the media managing software module to search for media and insert a reference to that media in the Web page. If she is unable to locate the needed media, the writer can also create a spec describing the media. Subsequently, an artist can generate a list of unfulfilled specs with the media managing software module. The artist can locate or create the needed media for the specs and associate the media with the specs. The artist can also verify that that the media associated with the specs for a Web page is available for insertion into the document.

These and other aspects of the invention will be described below in connection with the drawing set and the appended specification and claim set.

DETAILED DESCRIPTION OF THE
EXEMPLARY EMBODIMENTS

The present invention supports a collaborative approach to Web page design by facilitating the delegation of functions among artists and writers creating Web pages. The invention enables the collection and storage of media files for use in designing Web pages. Using a media managing software module, a writer can either locate and insert a media reference within a Web page or create a spec for media to be completed by an artist. The invention further supports the management of a Web design project by generating reports of unfulfilled specs and verifying that all referenced media files are available. The operation of the present invention is described within the representative environment of the Hypertext Markup Language (HTML). Alternative embodiments of the invention support the use of other markup languages including, but not limited to, Dynamic HTML (DHTML) and Extensible Markup Language (XML). Although graphic media may be used as an example in the following discussion, the invention supports the use of a variety of media in Web page design including, but not limited to, audio and video media.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations in a distributed computing environment by conventional computer components, including remote file servers, remote computer servers, remote memory storage devices, a processing unit, memory storage devices, display devices and input devices. Each of these conventional distributed computing components is accessible by the processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention also includes a computer program which embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and the preferred operating environment will be described.

Figure 1:
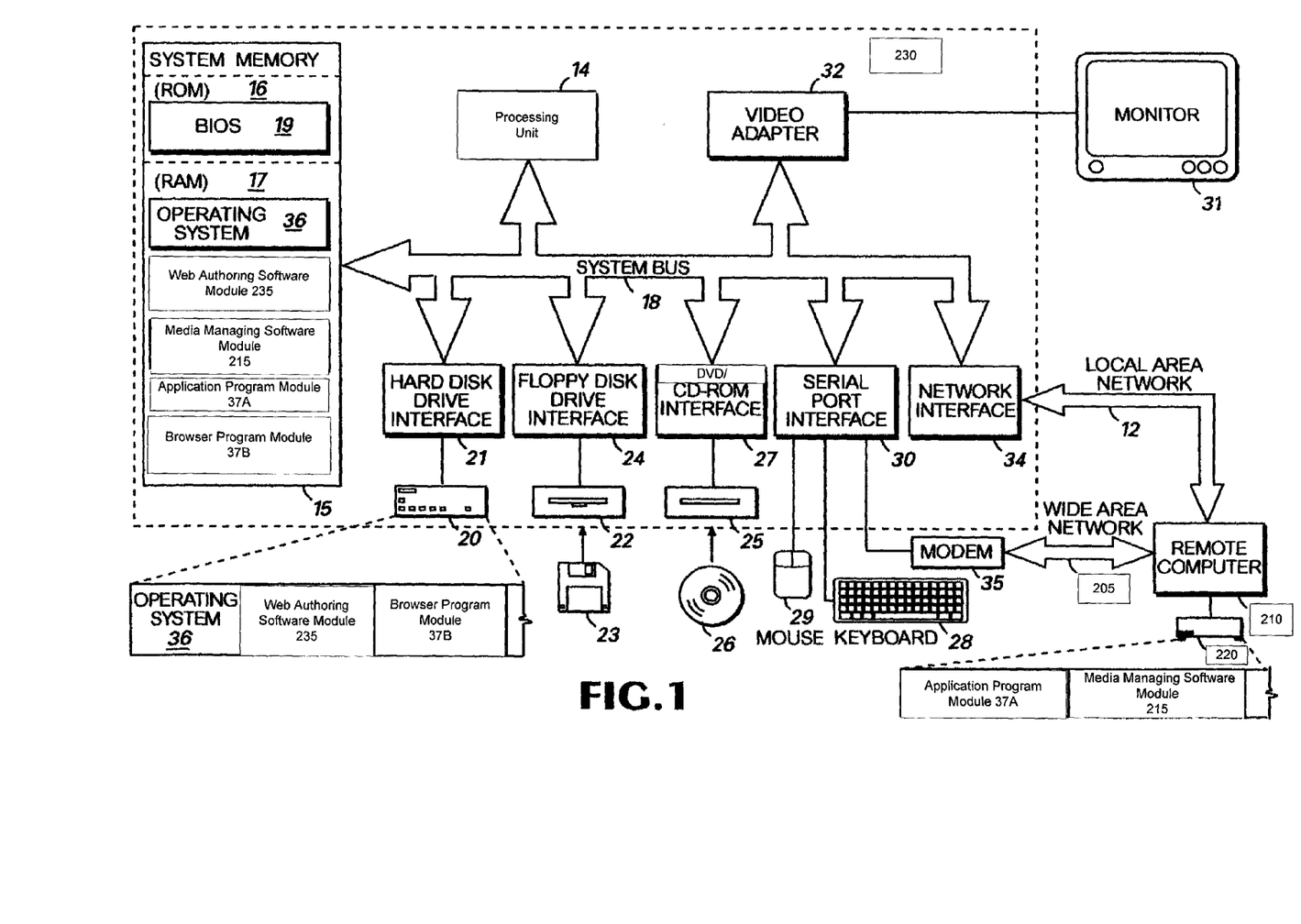
FIG. 1 is a functional block diagram illustrating the operating environment for an exemplary embodiment of the present invention.

FIG. 1 illustrates various aspects of an exemplary computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 230 suitable for supporting the operation of the preferred embodiment of the present invention. As shown in FIG. 1, the personal computer 230 operates in a networked environment with logical connections to a remote server 210. The logical connections between the personal computer 230 and the remote server 210 are represented by a local area network 12 and a wide area network 205. Those of ordinary skill in the art will recognize that in this client/server configuration, the remote server 210 may function as a file server or computer server.

The personal computer 230 includes a processing unit 14, such as "PENTIUM" microprocessors manufactured by Intel Corporation of Santa Clara, Calif. The personal computer also includes system memory 15, including read only memory (ROM) 16 and random access memory (RAM) 17, which is connected to the processor 14 by a system bus 18. The preferred computer 230 utilizes a BIOS 19, which is stored in ROM 16. Those skilled in the art will recognize that the BIOS 19 is a set of basic routines that helps to transfer information between elements within the personal computer 230. Those skilled in the art will also appreciate that the present invention may be implemented on computers having other architectures, such as computers that do not use a BIOS, and those that utilize other microprocessors.

Within the personal computer 230, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information into the personal computer 230 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote server 210 in this networked environment is connected to a remote memory storage device 220. This remote memory storage device 220 is typically a large capacity device such as a hard disk drive, CD-ROM or DVD drive, magneto-optical drive or the like. Those skilled in the art will understand that program modules, such as an application program module 37a, are provided to the remote server 210 via computer-readable media. The personal computer 230 is connected to the remote server 210 by a network interface 34, which is used to communicate over the local area network 12.

In an alternative embodiment, the personal computer 230 is also connected to the remote server 210 by a modem 35, which is used to communicate over the wide area network 205, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 230, those of ordinary skill in the art can recognize that the modem 35 may also be internal to the personal computer 230, thus communicating directly via the system bus 18. It is important to note that connection to the remote server 210 via both the local area network 12 and the wide area network 205 is not required, but merely illustrates alternative methods of providing a communication path between the personal computer 230 and the remote server 210.

Although other internal components of the personal computer 230 are not shown, those of ordinary skill in the art will appreciate that such components and the interconnection between them are well known. Accordingly, additional details concerning the internal construction of the personal computer 230 need not be disclosed in connection with the present invention.

Those skilled in the art will understand that program modules, such as an operating system 36, an application program module 37A, a browser program module 37B, a media managing software module 215, a Web authoring software module 235, and data are provided to the personal computer 230 via computer-readable media. In the preferred computer, the computer-readable media include the local or remote memory storage devices, which may include the local hard disk drive 20, floppy disk 23, CD-ROM or DVD 26, RAM 17, ROM 16, and the remote memory storage device 220. In the preferred personal computer 230, the local hard disk drive 20 is used to store data and programs.

Figure 2:
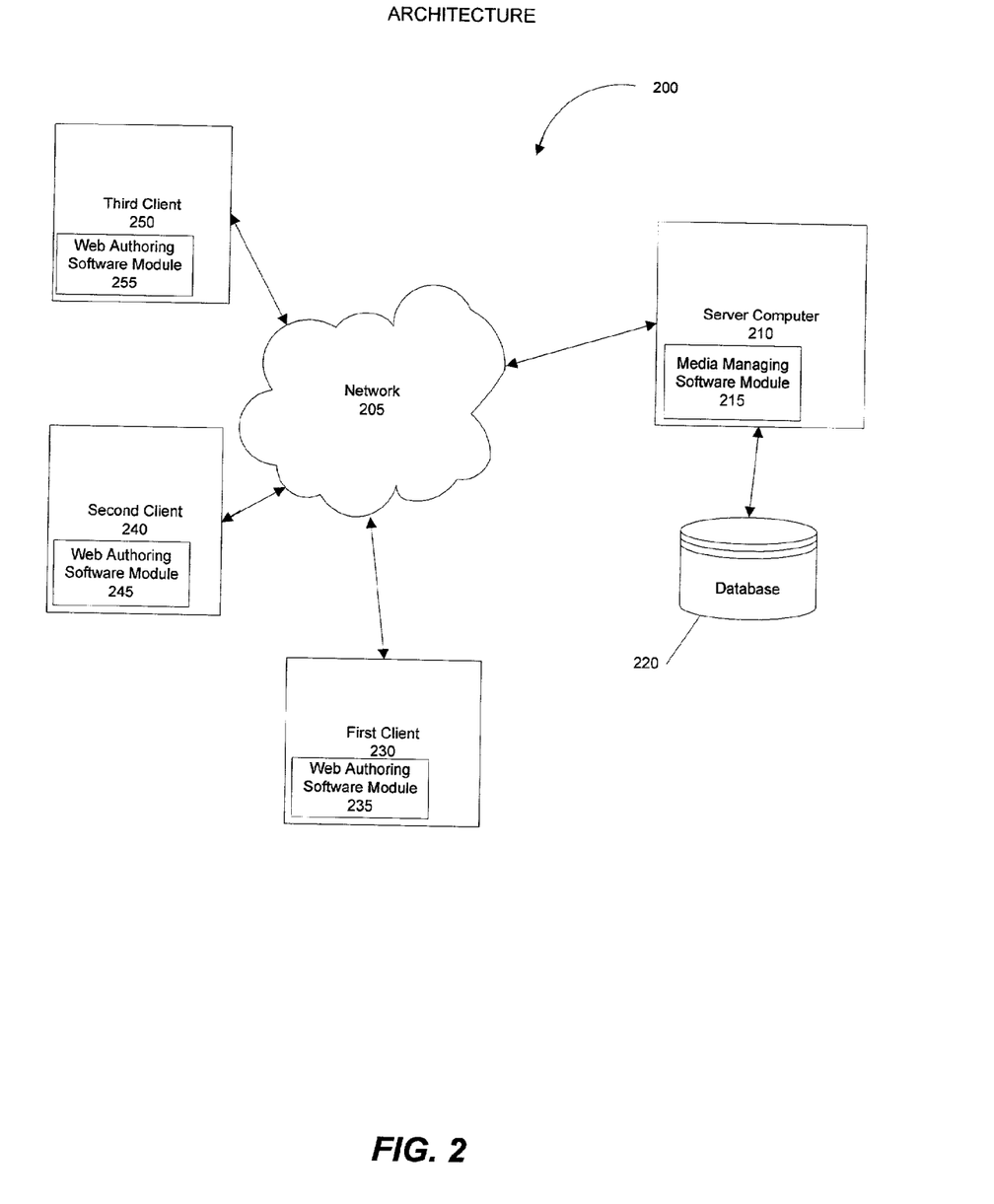
FIG. 2 is a functional block diagram illustrating the architecture of a distributed computing network in accordance with an exemplary embodiment of the present invention.

FIG. 2 illustrates an exemplary architecture in which the present invention can operate. FIG. 2 shows a distributed computing environment wherein a First Client 230, a Second Client 240, and a Third Client 250 are coupled to a server computer 210. Typically, the clients are coupled to the server computer 210 through a distributed computer network 205. The network 205 can be a local area network or a wide area network such as the World Wide Web. A media managing software module 215 resides on the server computer 210 and can be accessed by the clients over the network 205. A database 220, operable for storing data, can be coupled to the server computer 210. Web authoring software modules 235, 245, and 255 can be operated on First Client 230, Second Client 240, and Third Client 250, respectively. A Web authoring software module supports the creation of Web pages using a markup language such as HTML. A Web authoring software module can be a word processing software module with functionality for converting text into a markup language document.

Figure 3:
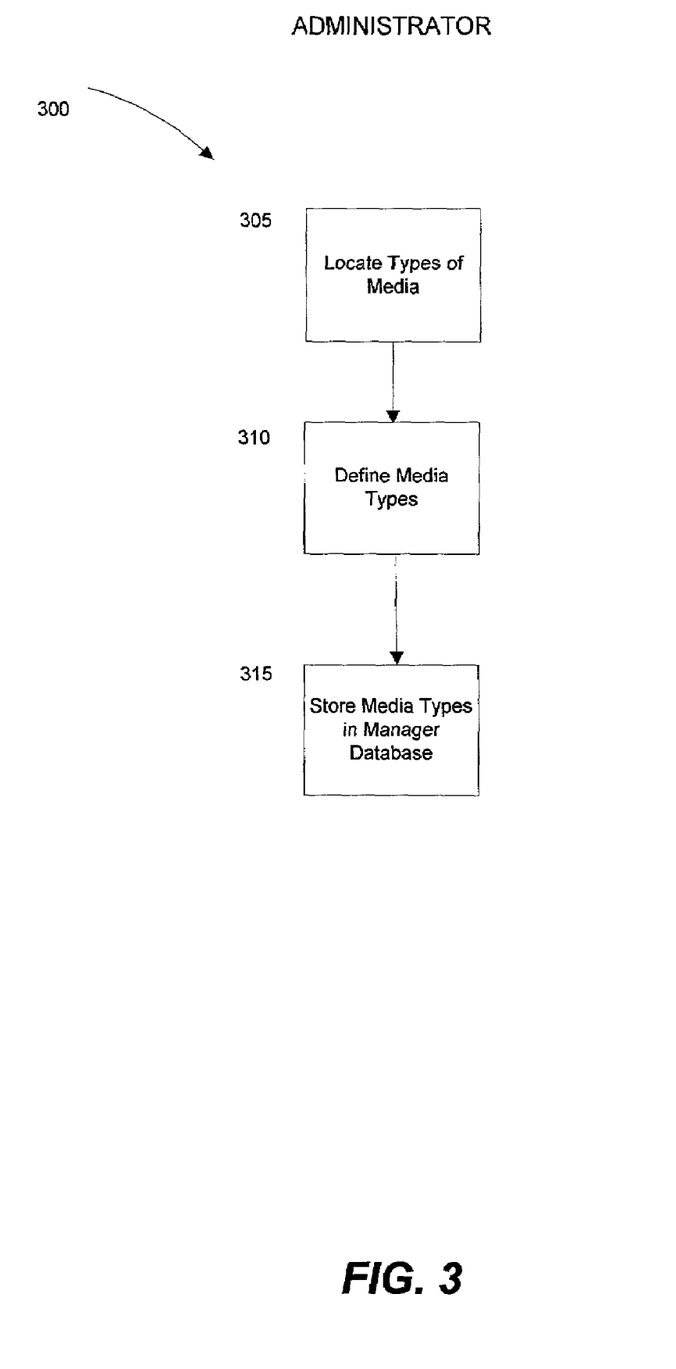
FIG. 3 is a logic flow diagram illustrating an exemplary process for an administrator collecting media.

Although not required, the media managing software module 215 typically works in conjunction with the Web authoring software module 235. The media managing software module 215 supports collaboration by First Client 230, Second Client 240, and Third Client 250 in creating Web pages. The Clients 230, 240 and 250 can use the media managing software module 215 to define media types, insert media references, create specs for media references to be inserted in Web pages, and support the association of media files with specs. Although the discussion that follows describes three different functions performed by three clients, the invention can support numerous clients working on different projects and performing different tasks. Furthermore, in alternative embodiments of the present invention, other architectures may be employed wherein software modules are stored and operated in varying local and remote locations Referring to FIG. 3, a logic flow diagram is shown illustrating an exemplary process for the tasks typically completed by an administrator in the creation of Web pages. One or more clients in the distributed computing environment may serve as an administrator. The administrator typically operates a client workstation and accesses the media managing software module 215 at the server 210 via the network 205. The administrator can use the media managing software module 215 prior to the creation of Web pages by the artists and writers. However, in alternative embodiments of the present invention, the administrator can also play an ongoing role of locating and defining additional types of media during the Web page creation process. In step 305, the administrator begins by locating types of media that the media managing software module 215 will support in creating Web pages. The administrator can define each media type within the media managing software module 210 by assigning a name, a file extension, and a tag which identifies the type of media in step 310. Defining the media types allows for the media to be associated the Web pages in HTML format. Types of media that can be used in Web page design include graphics, audio, and video. In step 315, the administrator stores the defined media types in database 220. Defining the media types organizes the media files which are eventually used in the Web pages created with the media managing software module 215.

Figure 4:
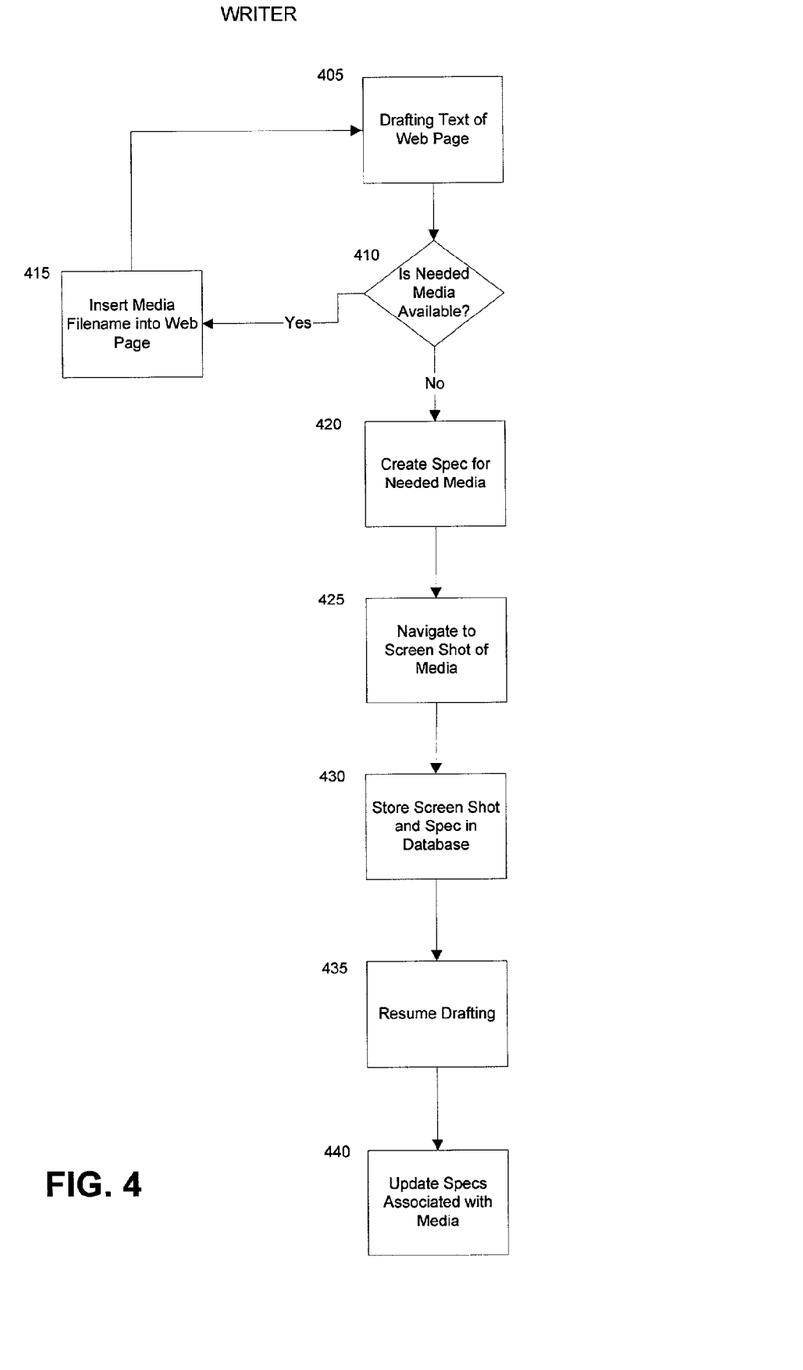
FIG. 4 is a logic flow diagram illustrating an exemplary process for a writer drafting a Web page.

FIG. 4 is a logic flow diagram illustrating an exemplary process for a writer collaborating on the creation of Web pages. The role of the writer can be performed by any of the clients shown in the distributed computer network in FIG. 2. The writer typically accesses the media managing software module 215 via the network 205 with a client workstation. In step 405, a writer begins by drafting the text for a Web page. At some point in the drafting process, the writer may need to insert media into the Web page. In step 410, the writer must decide whether or not the desired media is available for insertion into the document. The media managing software module 215 has a browser function that enables the writer to search for and view media files stored on the database 220. If the desired media file is available, the writer inserts an identifier for the content, such as the media file name, into the desired place in the Web page in step 415. If the desired media is not available, the "No" branch is followed to step 420 where the writer creates a spec for the needed media. The spec describes the desired media for the artist, who will later locate or create the media and associate a media file name with the spec. To assist the artist, the writer may navigate to a screen shot of the media, if it is available, and place it with the spec in step 425. In step 430, the writer stores the screen shot and spec in the database 220. The screen shot and spec can collectively be referred to as meta-data. The artist can later access the meta-data in order to fulfill the spec request.

After creating a spec for the desired media, in step 435 the writer can resume drafting the text for the Web page. In a collaborative approach to designing Web pages, the roles of the writer and artist are ongoing and they often perform their jobs intermittently. If a writer returns to drafting a Web page at a later time, she may want to see if the artist has fulfilled any of the spec requests. In step 440, the writer can select an update function supported by the media managing software module 215. For any specs that have been satisfied by the artist, the update function will replace those specs with a unique identifier, typically the file name, of the media. The exemplary process illustrated in FIG. 4 can continue repeatedly until all of the text for the Web pages of a particular project is completed.

Figure 5:
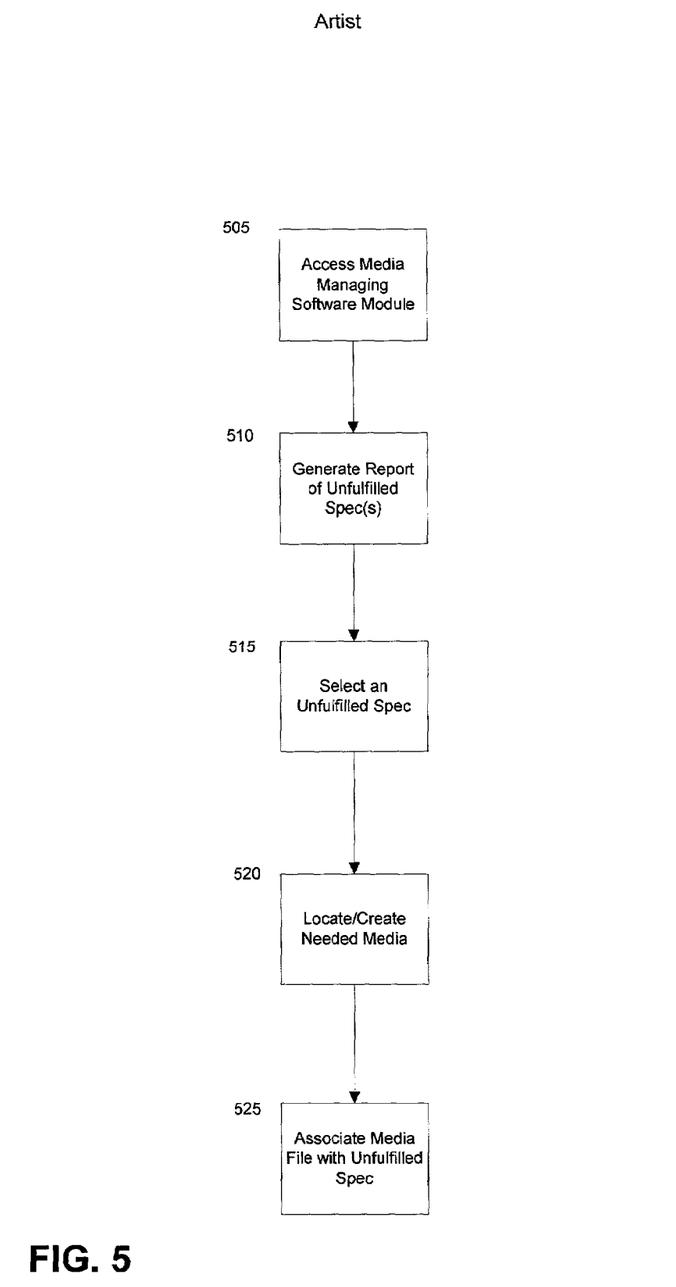
FIG. 5 is a logic flow diagram illustrating an exemplary process for an artist fulfilling specs of a Web page.

Referring to FIG. 5, an exemplary process for the tasks completed by an artist is illustrated in support of the creation of a Web page. The role of the artist can also be performed by any of the clients shown in the distributed computing environment in FIG. 2. The artist's job is to assist the writer by fulfilling all specs for media in the Web pages that are being created. In step 505, the artist accesses the media managing software module 215. A particular project that an artist and writer are working on may contain several Web pages with many specs for media. In step 510, the artist will generate a report of unfulfilled specs for a particular project. An unfulfilled spec can include any request from the writer that does not have media associated with it. In step 515, the artist will select a particular spec to work on from the report of unfulfilled specs. The spec typically contains a description of the type of media the writer would like to insert at a particular point in the Web page and this data is stored in the database 220. The spec can also contain a screen shot inserted by the writer to assist the artist in preparing the correct media. In step 520, the artist will locate or create the media requested by the spec. In step 525, the artist associates a media file with the unfulfilled spec that he is working on. In associating the media file with the unfulfilled spec, the artist links the media file with the spec so that the media manager can access the media file during the update function described in FIG. 4. The media file will contain the desired media and can be stored on the database 220. The artist can repeat this process for all unfulfilled specs in the report generated by the media managing software module 215. The media managing software module 215 automatically replaces the spec references in the HTML document with the associated media file references.

Figure 6A:
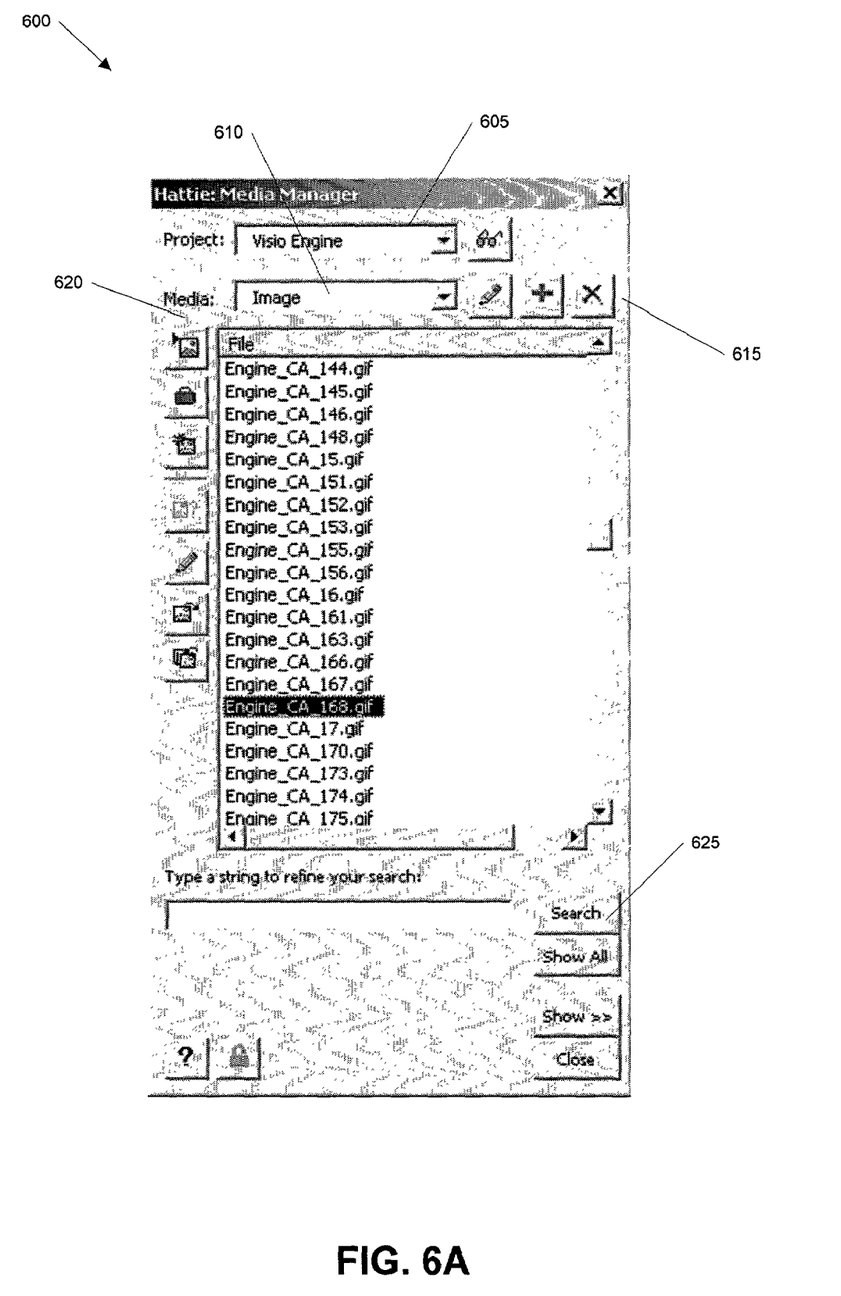
FIG. 6A illustrates an exemplary display screen showing the functions of an exemplary media managing software module.

FIG. 6A illustrates an exemplary display screen viewed when a client accesses the media managing software module 215. Window 605 displays the name of the Web design project and window 610 displays a media type as defined by the administrator. An administrator can use the options in element 615 to add, delete or edit the defined media types for a particular Web project. The column of options listed at 620 are some of the various functions that the media managing software module 215 can perform. These functions include, but are not limited to, importing and exporting media files, creating specs, associating media files with the specs, and adding files to or selecting files from the database 220. Using the search functions 625 in the bottom of the exemplary screen display in FIG. 6A, a client can search for meta-data stored in the database 220.

Figure 6B:
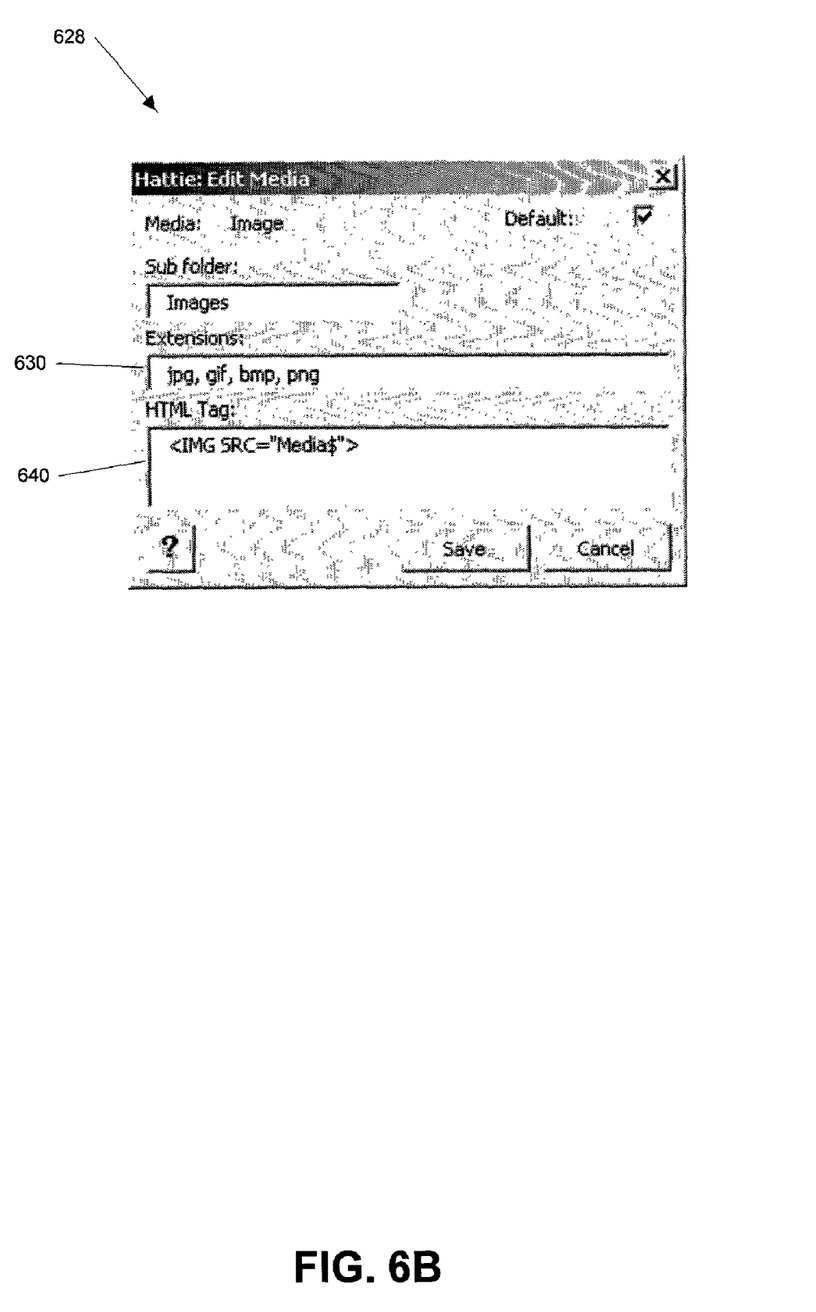
FIG. 6B illustrates an exemplary display screen for editing a media type.

FIG. 6B illustrates an exemplary display screen shown when the edit option of element 615 is selected. The extensions window 630 displays the types of files that can be found in the subfolder as defined by the administrator. The HTML tag window 640 displays the tag that is inserted in a Web page at the point where media is to be placed. The tag indicates where in the database 220 the referenced media file can be found.

Figure 7A:
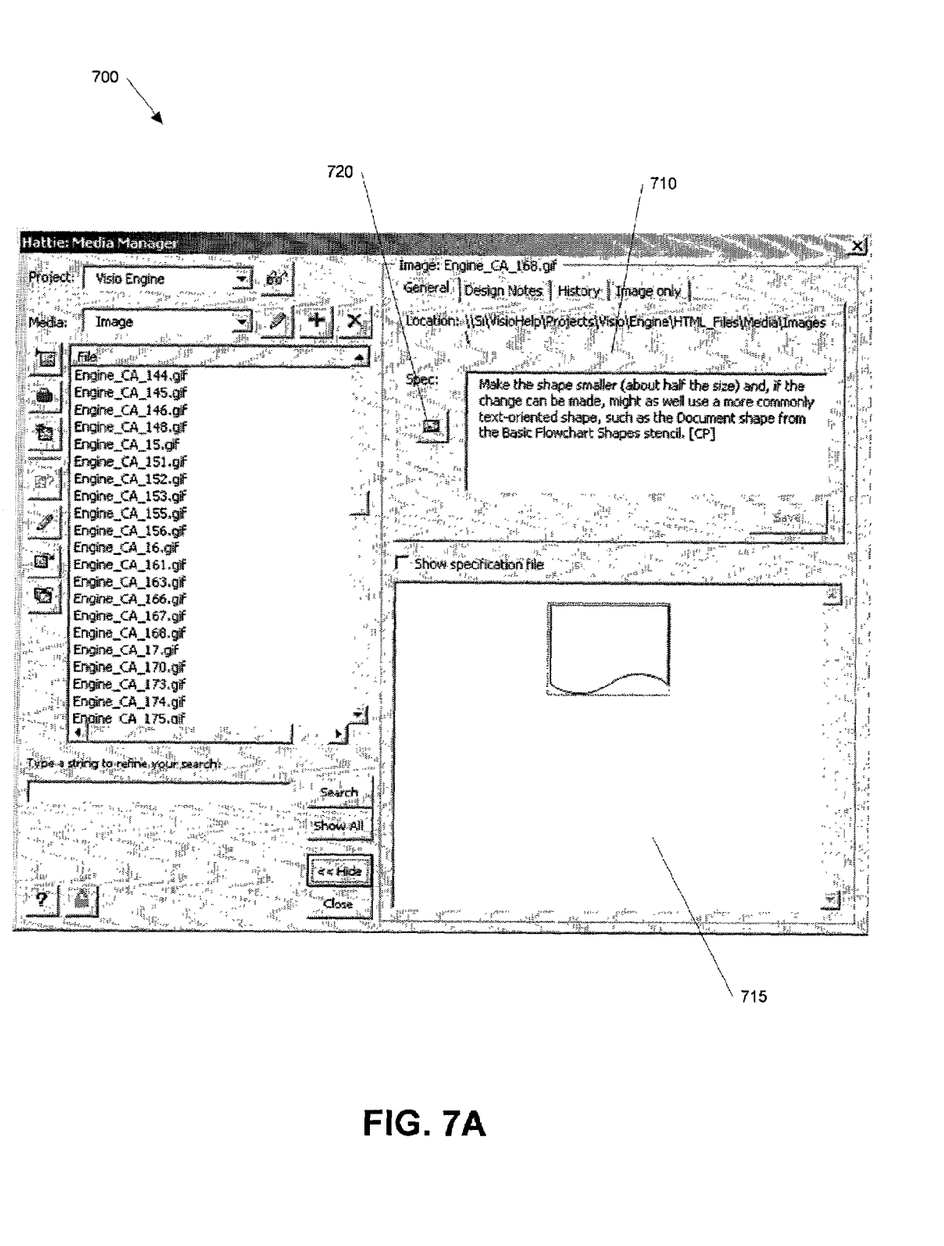
FIG. 7A illustrates an exemplary display screen for associating a spec with a media file.

Referring to FIG. 7A, an exemplary display screen is illustrated for a particular spec generated in a report by the media managing software module 215. The spec window 710 shows the location of the spec information in the database 220. The spec window 710 also displays the description of the media desired by the writer for this particular Web page. The media window 715 shows an illustration of the media that will be associated with this spec. When an artist selects the associate function 720, the media displayed in window 715 will be associated with the spec in the spec window 710.

Figure 7B:
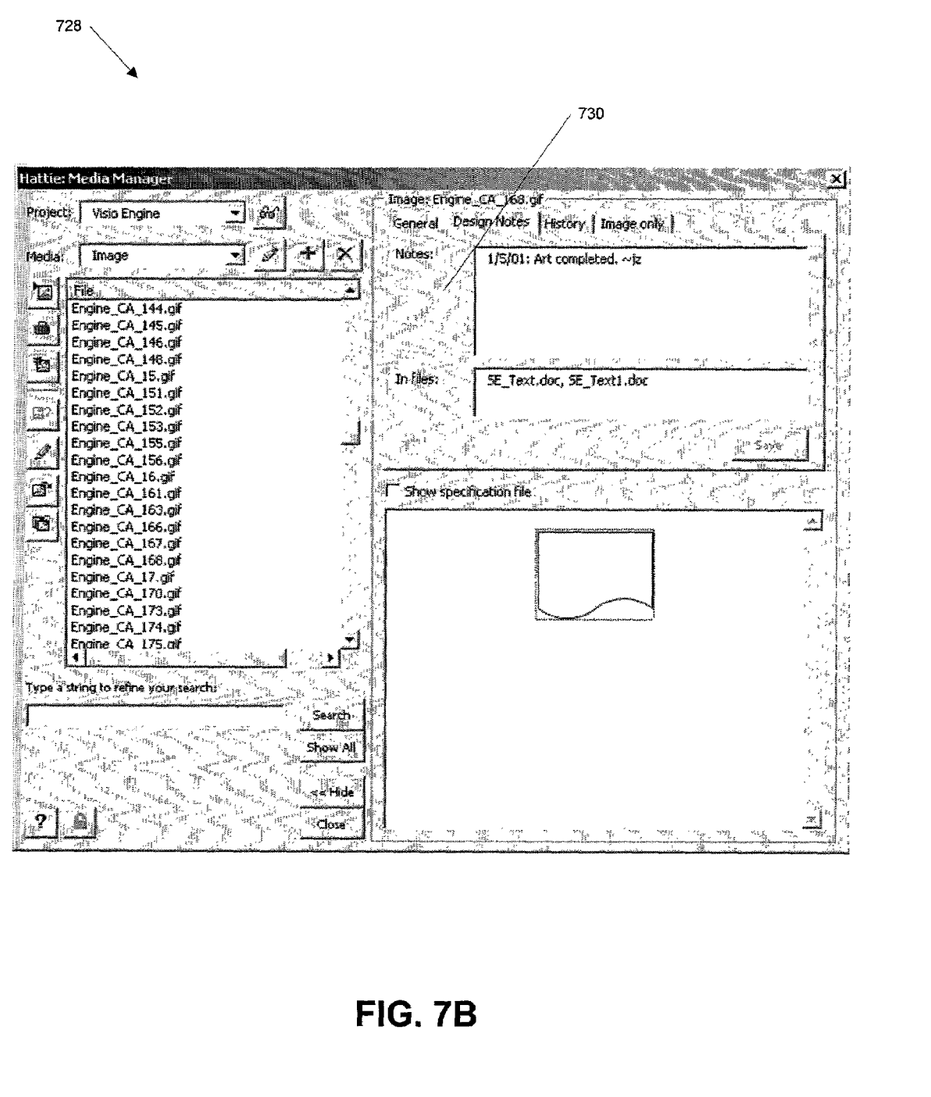
FIG. 7B illustrates an exemplary display screen showing design notes for a media file associated with a spec.
Figure 7C:
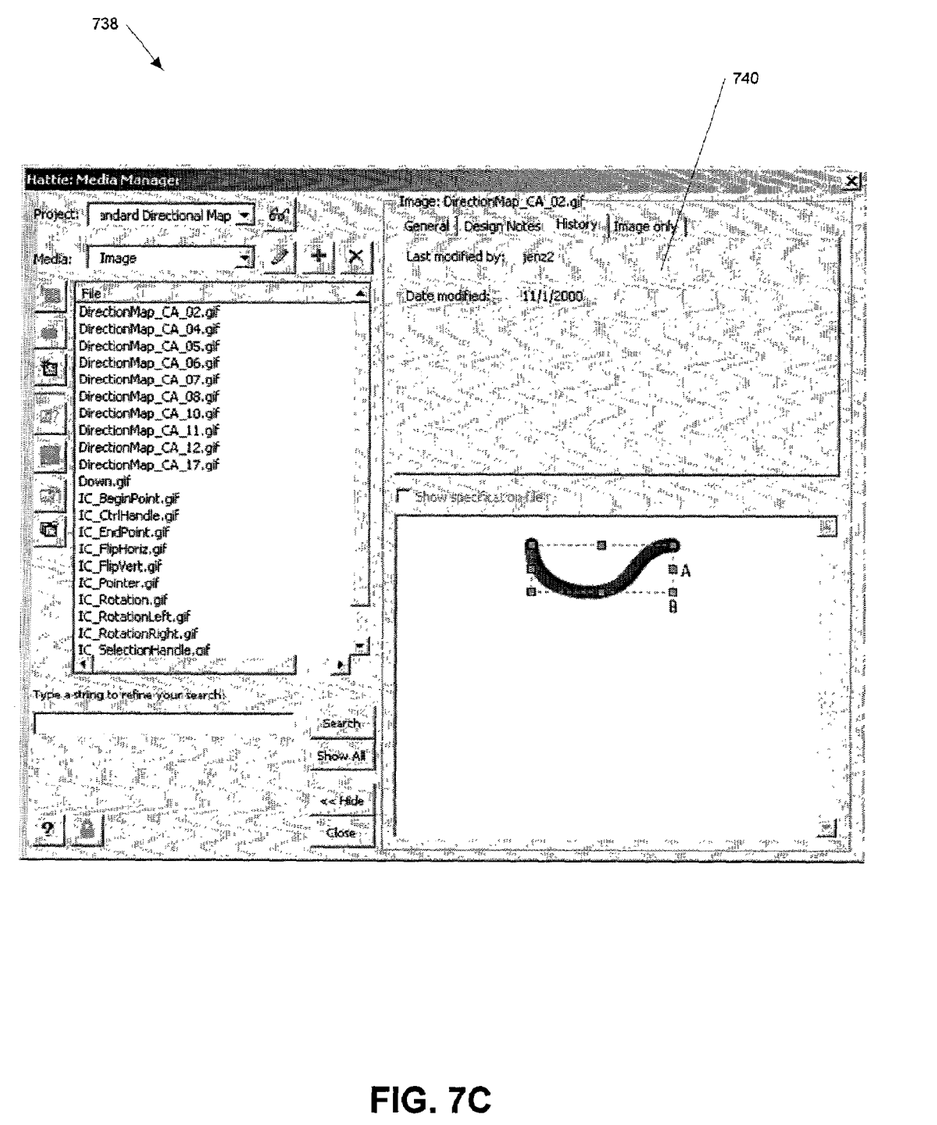
FIG. 7C illustrates an exemplary display screen showing the history of a media file associated with a spec.

FIG. 7B is an exemplary display screen shown after a media file is associated with a spec. The design notes window 730 indicates when a piece of media was completed and the artist that completed it. The lower portion of the design notes window 730 provides the name of the media file where the media is located. FIG. 7C is an exemplary display screen showing history information for the media.

The history window 740 contains the date the media was last modified and the name of the artist that made the changes.

In conclusion, the present invention enables and supports a collaborative approach to designing Web pages. The invention facilitates division of the tasks among writers and artists that create Web pages. The invention provides a means for a writer to either insert media references directly into a Web page or to create a detailed request for an artist to create or locate the needed media. The invention also provides a means for tracking the status of a Web design project by monitoring which specs have been fulfilled. Finally, the invention supports the collection and storage of media for use in various Web design projects.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof. For instance, the present invention could be used with markup languages other than HTML such as DHTML and XML. The foregoing embodiment, which illustrates the use of graphic media in the text body of a Web document is representative. The invention also encompasses the use of other types of media, such as audio and video, in other types of Web documents. Although the present invention has been described as operating on either a stand alone computer or a local computing network, it should be understood that the invention can be applied to other types of distributed computing environments.

What is claimed is:

1. A method in a media managing software module executing on a computer system for creating a web page, the method comprising:
    providing existing specs for media elements;
    displaying to a writer the existing specs for the media elements so that the writer can locate a desired media element;
    when the writer locates a desired media element based on review of the existing specs, inserting a unique identifier for the located media element into the web page;
    when the writer does not locate a desired media element based on review of the existing specs, creating a spec describing the desired media element as indicated by the writer and storing the created spec in association with the web page so that an artist can subsequently retrieve and use the spec to create the desired media element for the web page; and
    after the artist has created the desired media element and when the writer selects to update the web page, inserting a unique identifier for the created media element into the web page.

2. The method of claim 1 including attaching a screen shot of the desired media element to the spec.

3. The method of claim 1 including continuing to create the web page after the spec is created or the unique identifier is inserted.

4. The method of claim 1 including updating a created spec.

5. The method of claim 1 wherein the writer and the artist are the same person.

6. The method of claim 1 including generating a report of unfulfilled specs for which an artist has not created the desired media element.

7. A computer-readable medium containing instructions for controlling a computer system to create a web page, by a method comprising:
    displaying to a writer existing specs for media elements so that the writer can locate a desired media element to add to the web page;
    when the writer locates a desired media element, inserting a unique identifier for the located media element into the web page;
    when the writer does not locate a desired media element, creating a spec describing the desired media element and storing the created spec in association with the web page so that an artist can subsequently retrieve and use the spec to create the desired media element for the web page; and
    after the artist has created the desired media element, inserting a unique identifier for the created media element into the web page.

8. The computer-readable medium of claim 7 wherein the unique identifier for the created media element is inserted into the web page when the writer indicates to update the web page.

9. The computer-readable medium of claim 7 including attaching a screen shot of the desired media element to the created spec.

10. The computer-readable medium of claim 7 including continuing to create the web page after the spec is created or the unique identifier is inserted.

11. The computer-readable medium of claim 7 including updating the created spec.

12. The computer-readable medium of claim 7 wherein the writer and the artist are the same person.

13. The computer-readable medium of claim 7 including generating a report of unfulfilled specs for which an artist has not created the desired media element.

14. The computer-readable medium of claim 7 including notifying the writer of a spec for which a desired media element has been created.

15. A computer system including memory for creating a web page, comprising:
    a component that provides existing specs for media elements so that a writer can locate a desired media element to add to the web page;
    a component that inserts a unique identifier for the located media element into the web page when the writer locates a desired media element;
    a component that, when the writer does not locate a desired media element, creates a spec describing the desired media element that includes a screen shot and storing the created spec in association with the web page;
    a component that generates a report of unfulfilled specs for which an artist has not created the desired media element so that the artist can retrieve and use the spec to create the desired media element for the web page;
    a component that notifies the writer when the desired media element has been created; and
    a component that inserts a unique identifier for the created media element into the web page when requested by the writer.

* * * * *